Aug. 19, 1941.   C. W. HIGGS   2,253,294
FRICTION CLUTCH
Filed Feb. 7, 1938    3 Sheets-Sheet 1
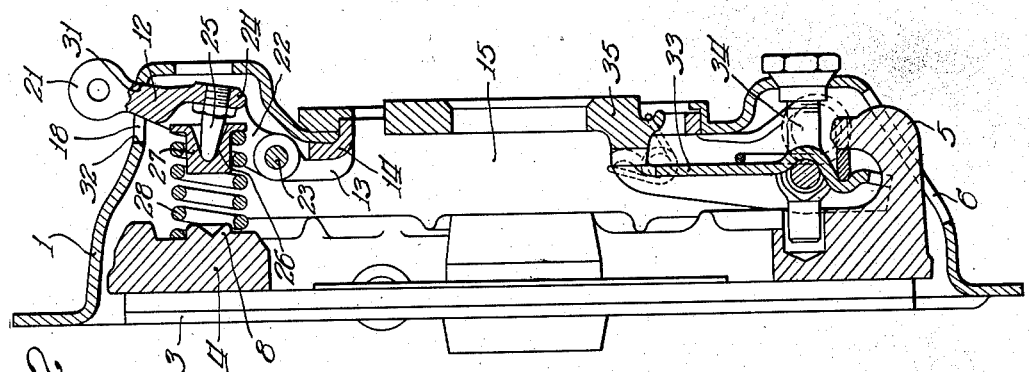
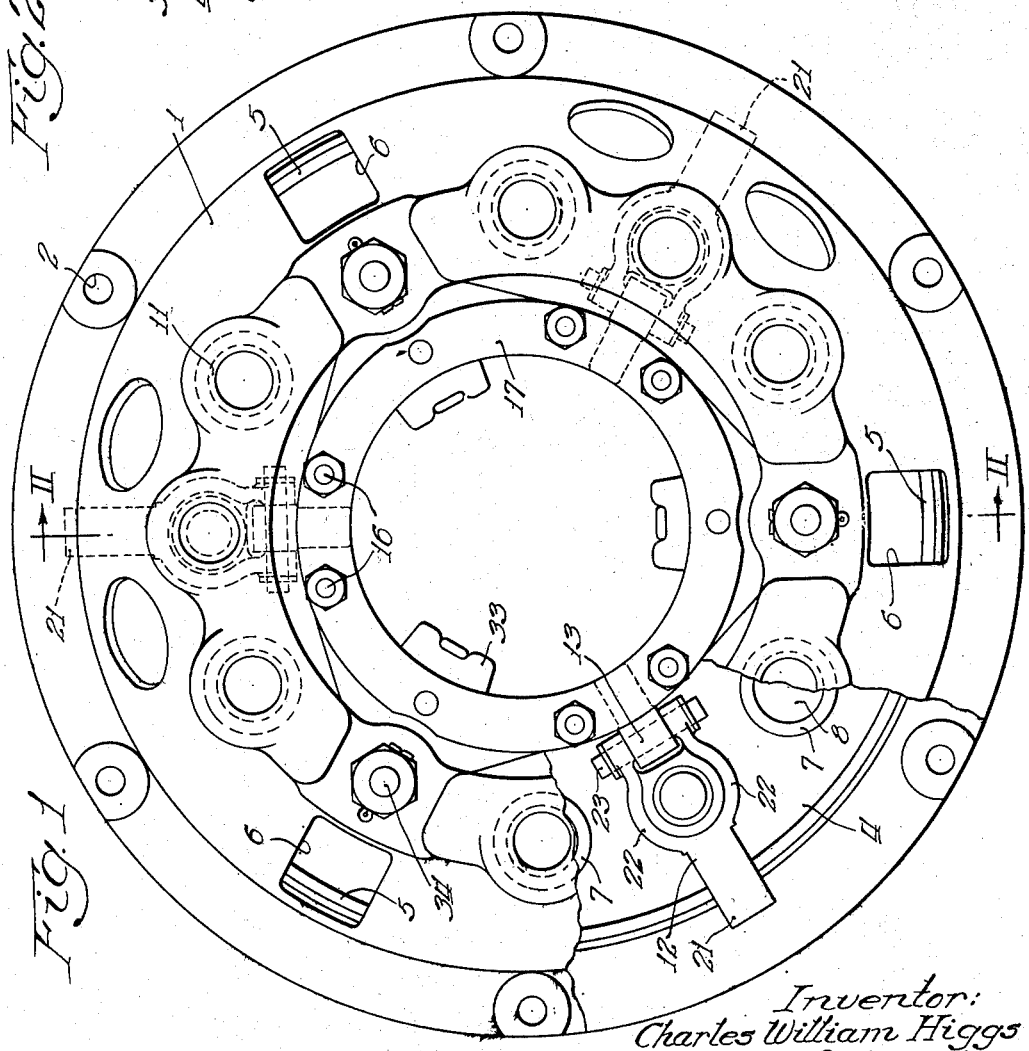
Inventor:
Charles William Higgs
By Edward C. Gritzbaugh
Atty.

Aug. 19, 1941.   C. W. HIGGS   2,253,294
FRICTION CLUTCH
Filed Feb. 7, 1938   3 Sheets-Sheet 2
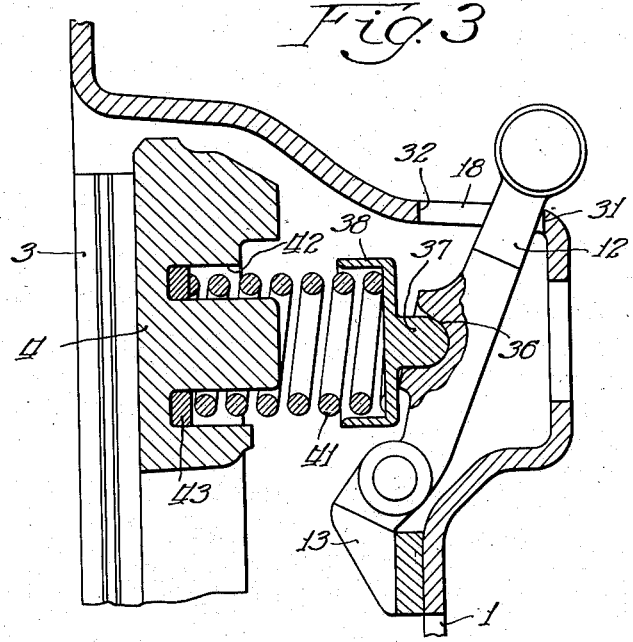
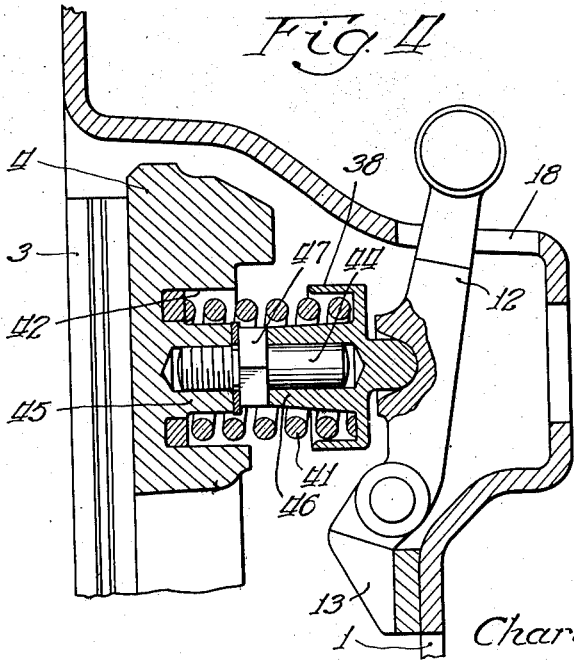
Inventor:
Charles William Higgs
By: Edward C. Gritzbaugh
Atty.

Aug. 19, 1941.  C. W. HIGGS  2,253,294
FRICTION CLUTCH
Filed Feb. 7, 1938   3 Sheets-Sheet 3
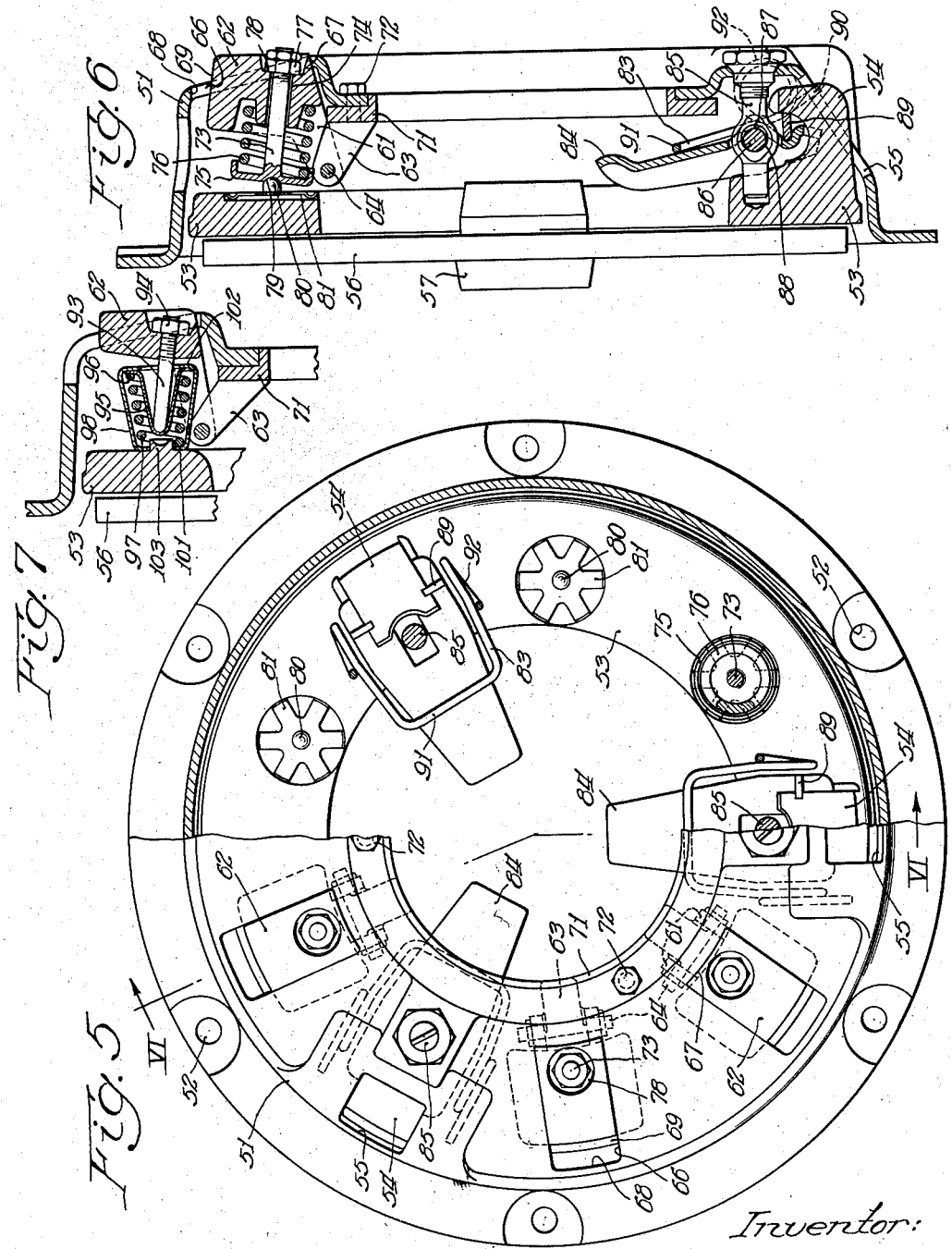
Inventor:
Charles William Higgs
By: Edward C. Gritzbaugh
Atty.

Patented Aug. 19, 1941

2,253,294

UNITED STATES PATENT OFFICE 2,253,294

FRICTION CLUTCH

Charles William Higgs, London, England, assignor to Borg-Warner Corporation, Chicago, Ill., a corporation of Illinois Application February 7, 1938, Serial No. 189,067
In Great Britain February 8, 1937

4 Claims. (Cl. 192—105)

This invention relates to friction clutches primarily for use in automobile vehicles, of the type comprising one or more driven plates which is or are engaged by axial pressure between the fly-wheel of the vehicle engine and a driving plate or plates revolving therewith, the whole of the engaging plates being more or less enclosed by a cover plate bolted or otherwise rigidly attached to the fly-wheel. The invention relates more specifically to clutches of this type in which the engaging pressure is provided wholly or in part by centrifugal action produced on pivotally mounted elements by rotation of the clutch.

The objects of the invention are to provide a clutch of this type in which the mounting of the centrifugal elements is such as to secure adequate support for the elements against the forces set up, and generally to improve the construction of the clutch.

According to the invention the centrifugal elements comprise weights mounted on levers swinging in planes radiating from the axis of the clutch, the levers being pivotally mounted at their ends adjacent the axis of the clutch in brackets formed on or carried by the cover plate of the clutch, the levers projecting in a generally radial direction so that the brackets take the outward component of the centrifugal force on the centrifugal elements.

According to one feature of the invention the centrifugal elements comprise weighted levers projecting in a generally radial direction from the axis of the clutch, and pivotally mounted at their inner ends on the cover plate of the clutch to swing in planes radiating from said axis and a resilient thrust member is arranged between each lever and the pressure plate to transmit the centrifugal load to the pressure plate.

The brackets on which the levers are mounted are preferably carried by or formed integral with a supporting ring itself mounted on the cover plate of the clutch.

The invention will now be described with reference to the accompanying drawings, in which:

Figure 1 is an end elevation partly in section of one form of clutch made according to the invention, the clutch being of the type in which the engaging pressure is provided in part by springs and in part by centrifugal force;

Figure 2 is a section on the line II—II of Figure 1;

Figure 3 is a view corresponding to Figure 2 showing a modified arrangement;

Figure 4 is a view showing a further modified arrangement;

Figure 5 is an end elevation of a clutch made according to the invention, and in which the engaging pressure is provided entirely by centrifugal force; on the right-hand side of this figure the cover plate and certain other parts have been removed to show the parts lying behind them;

Figure 6 is a section on the line VI—VI of Figure 5; and

Figure 7 is a section corresponding to Figure 6 and showing a modified arrangement of centrifugal element.

Referring to Figures 1 and 2 of the drawings, which show a clutch of the type generally known as semi-centrifugal, 1 is the cover plate, the rim of which is pierced at 2 to receive bolts securing the cover plate to the fly-wheel (not shown) of a vehicle engine.

A driven plate 3 is arranged between the face of the fly-wheel and an annular pressure plate 4 mounted between the driven plate 3 and the cover plate 1. The pressure plate receives the engaging pressure to grip the driven plate 3 between it and the fly-wheel face.

The pressure plate 4 is caused to rotate with the cover plate 1 by a series of lugs 5 which are carried by the pressure plate, and project through slots 6 in the cover plate.

The engaging pressure is provided in part by a number of springs 7, of which six are shown in the drawings, these springs acting between the pressure plate 4 and the cover plate 1. Locating projections 8 for the springs are formed on the back of the pressure plate, and recesses 11 in the cover plate locate the ends of the springs bearing thereagainst.

The springs 7 provide sufficient pressure to transmit the torque through the clutch at low speeds. Additional pressure is provided when the clutch rotates at greater speeds, by the action of centrifugal force on the centrifugal elements. These comprise levers 12 pivoted on ears or lugs 13 projecting from a ring 14 surrounding the central aperture 15 in the clutch cover, through which the driven shaft carrying the plate 3 extends. The ring 14 is of L section, and is held in position by bolts 16 passing through it and through a second ring 17, the inner rim of the cover plate being gripped between the ring 14 on its inner side and the ring 17 on its outer side. The levers 12 project through slots 18 in the cover plate 1, and carry on their outer ends masses 21 to increase the effect of the centrifugal force. Each lever is bifurcated at its inner end, forming a fork, the arms 22, 22 of which lie on each side of the lug 13. A pin 23 passing through both arms and the lug has suitable retaining means, such as washers and split pins at each end. The two arms 22 are bowed outwardly as seen in Figure 1, and are connected by a web 24 which is displaced considerably from the general plane of the lever 12, providing between the arms of the lever a recess into which extends the thrust member for transmitting the force from the lever to the pressure plate. The thrust member is engaged by a stud 25 having a part spherical head and slightly conical shank which is threaded into the web 24, the stud engaging with a conical recess 26 in a collar 27 which together with a spring 28 forms the thrust member. The spring bears at its other end on the pressure plate 4, on which it is located by a projection 8 similar to those locating the ordinary pressure springs. The slot 18 in the cover plate through which the lever 12 projects is of such length that its two ends 31, 32 form stops for the lever at either end of its movement.

When the clutch is not rotating, or is rotating very slowly, the levers bear against the ends 31 of the slots, and the springs 28 exert a certain minimum pressure on the pressure plate, depending on their initial "set" or loading. More rapid rotation of the clutch causes centrifugal force acting on the masses 21 to swing the levers about their pivots towards a position in which they lie in a plane at right angles to the clutch axis, thus increasing the loading of the springs 28, and so increasing the engaging pressure on the clutch. The increase of pressure is limited to a predetermined maximum by the levers 12 engaging the ends 32 of the slots 18, with the result that any further pressure due to additional speed increase, is taken by the cover plate.

Disengagement of the clutch is effected in the known manner by levers 33, fulcrumed on posts 34 carried by the cover plate, and engaging the lugs 5 on the pressure plate 4. The inner ends of these levers engage the surface of a plate 35 movable axially towards and away from the clutch by suitable mechanism, movement of the plate 35 towards the clutch causing the levers 33 to turn about their fulcrums and move the pressure plate away from the flywheel, against the pressure of the springs.

Figure 3 is a fragmentary section showing one of the centrifugal elements and illustrating a modified form. Here again the lever 12 is pivoted on a lug 13 attached to the cover plate 1, each lug 13 being part of a separate bracket independently secured to the cover plate 1, or preferably being formed as a part of a ring as in Figures 1 and 2. The lever in this case is substantially straight and has a substantially hemispherical recess 36 which receives the hemispherical end of a central boss 37 formed on a cup 38 constituting an abutment for a spring 41, the other end of which spring is seated in an annular recess 42 in the cover plate 1, a washer 43 composed of material having a low heat conductivity being fitted in the base of the recess to reduce the transference of heat to the spring. The lever 12 in this arrangement is of simpler form than that shown in Figure 2, but, as can be seen, it provides less space between the pressure plate 4 and the spring abutment on the lever than does the arrangement of Figure 2, and so makes it necessary, in order to obtain a sufficient length of spring, to form the deep recess 42 in the pressure plate, which is less desirable in view of the consequent heating of the spring.

In this case also the ends 31 and 32 of the slot 18 form stops to limit the movement of the lever 12, the latter stop limiting the pressure due to centrifugal force which can be applied to the clutch.

Figure 4 is a section corresponding to Figure 3, showing another modified arrangement of the centrifugal element. The lever 12 is identical with that shown in Figure 3 and it is mounted in the same manner. The spring 41 in this arrangement surrounds a telescopic thrust link, one part 44 of which is formed by a stud screwed into a boss 45 in the centre of the spring recess 42 in the pressure plate 4. The other part is in the form of a sleeve 46 which projects from the centre of the spring abutment cup 38 engaging the lever 12, and which slides on the stud 44. The end of the sleeve 46 engages, after a certain movement of the lever under the action of centrifugal force, with a collar 47 on the stud 44 so that the centrifugally generated clutch-engaging pressure is applied at first through the spring 41, and subsequently through the rigid thrust link formed by the parts 44 and 46. The slot 18 is so dimensioned that the lever 12 does not strike the end when it moves under the centrifugal force, the full force being transmitted through the link 44, 46 to the pressure plate at all speeds.

Figures 5 and 6 show another form of the invention, these views illustrating a clutch of the type in which the whole of the engaging pressure is provided by the action of centrifugal force on a number of weighted levers, each of which has a resilient link between it and the pressure plate through which the pressure is applied to the latter.

The clutch has a cover plate 51 arranged for bolting to the fly-wheel (not shown) of a vehicle engine through holes 52 in its peripheral flange. Within the cover plate is mounted a pressure plate 53 having lugs 54 projecting through slots 55 in the wall of the cover plate to provide a positive rotational coupling between them. A driven plate 56 mounted on a hub 57 is arranged between the fly-wheel and the pressure plate 53, and is gripped between them by axial pressure on the pressure plate in the well known manner, to transmit rotation from the fly-wheel to a driven shaft on which the hub 57 is slidably but non-rotationally mounted.

The engaging pressure is provided by a number of centrifugal elements, e. g. six, comprising levers 61, carrying masses 62 at their outer ends, and mounted on brackets 63 by means of pivot pins 64. Each of the levers 61 has two arms which lie one on each side of a bracket 63. The masses 62 are disposed at an angle to the levers 61, forming centrifugal members of substantially L-shape. It will be noted that although these levers are L-shaped whilst those shown in Figures 1 to 4 are straight, the levers in both cases are functionally identical, being pivoted at their inner ends to the cover plate of the clutch, being weighted at their outer ends, and transmitting the loading to the pressure plate from a point intermediate their ends.

The cover plate 51 is slotted at 66 adjacent each centrifugal element, and the masses 62 project into the slots 66, their movement being limited in extent by the ends 67 and 68 of the slots. In the disengaged position of the clutch, which is illustrated on the drawings, the masses 62 abut against the ends 67 of the slots, and when acted on by the centrifugal force, they move towards a position in which their toe ends 69 strike the ends 68 of the slots, thus limiting the centrifugal load which can be applied to engage the clutch.

The brackets 63 are formed integral with an L-shaped ring 71, which is bolted to the inner rim of the cover plate by bolts 72.

The resilient thrust members by which the load due to centrifugal force is transmitted to the pressure plate consist of plungers each comprising a stem 73 slidable in a hole 74 through the mass 62, and a cup-shaped head 75 which serves to locate the end of a spring 76 fitted between the head and the mass 62. A nut 77 on the threaded end of the stem 73 limits the movement of the plunger by engaging the outer surface of the mass 62 or, as shown, the bottom of a recess 78 therein, and a locknut is provided to retain the nut 77 in position. A part spherical recess 79 in the head 75 receives a boss 80 mounted in the centre of a flat star-shaped spring 81, bearing on the pressure plate 53.

In the inoperative position of the centrifugal element, that is when the mass 62 is bearing on the end 67 of the slot, the nut 77 is held up against the mass 62 by the spring 76, and the plunger projects to its maximum extent. The nut 77 is so adjusted that with the plunger in this position the pressure plate 53 can move away from the driven plate 56, and the clutch be thus disengaged.

The pressure plate is urged towards this disengaged position by U-shaped springs 83 associated with release levers 84 employed in the known manner to produce manual disengagement of the clutch. These levers 84 are of pressed steel, and are fulcrumed on posts 85 mounted in the cover plate as in Figures 1 and 2, rollers 86 fitting in grooves 87 in the levers being arranged to roll on the flat sides of apertures 88 in the posts 85. Struts 89 between the outer ends of the levers 84 and undercut portions of the lugs 54 transmit movement of the levers to the pressure plate 53. The inner ends of the levers 84 cooperate with a release bearing in the known manner.

The U-shaped springs 83 have their base portions 91 in engagement with the levers 84, and their free ends engage in apertures 90 in the cover plate, each arm of the spring being formed into one or more coils 92 to give the desired degree of resilience. As will be seen in Figure 6, the springs 83 tend to urge the inner ends of the levers 84 towards the pressure plate, thus tending to rock the levers about their fulcrums in such a way as to move the pressure plate 53 away from the driven plate, so that it pushes back the centrifugal elements through the springs 76, until the release levers 84 engage at 91 on the pressure plate thus limiting the movement of the pressure plate. The clutch is then disengaged and in that position the star-shaped springs 81 hold the centrifugal elements against their stops 67 and prevent rattling.

The clutch is therefore maintained in the disengaged position by the springs 83, so long as there is no centrifugal force acting, that is so long as the clutch is not rotating. Rotation of the clutch causes centrifugal force to act on the masses 62, and as soon as the force is sufficient to overcome the springs 83 the pressure plate is moved forward into engagement with the driven plate. Further increase of the centrifugal force due to increasing speed of rotation causes the masses 62 to move relatively to the plungers 73—75, compressing the springs 76 and providing an engaging pressure which increases with the speed of the clutch, until the masses 62 engage the ends 68 of the slots 66 in the cover plate, after which any additional force is transmitted to the cover plate, and does not increase the loading on the pressure plate.

If it is desired to release the clutch while it is rotating at a sufficiently high speed to be engaged by the centrifugal force, a release bearing is moved by an actuating linkage of the known kind to bear on the inner ends of the release levers 84, causing them to move about their pivots and separate the pressure plate from the driven plate against the resistance of the springs 76 and the centrifugal elements.

There is thus provided a clutch whose engaging pressure is derived entirely from centrifugal action, which becomes released automatically at speeds of rotation below some predetermined speed, and which can be manually released under any conditions.

Figure 7 shows a modified form of resilient thrust member between the centrifugal element and the pressure plate 53. A pin 93 is screwed into the mass 62 and locked by a nut 94, the pin engaging with a deeply recessed thimble member 95 having a flange 96 at its rear end. The spring 97 is enclosed in a frusto-conical casing 98 having inturned flanges 101, 102 at its ends, the flange 96 of the thimble 95 being inside the flange 102, so that the spring 97 acts between the flanges 101, 96 and is limited in its extension by the abutment of flange 96 on flange 102. A projection 103 on the rear face of the cover plate 53 locates the spring 97 and casing 98.

It will be seen that this arrangement works in a similar manner to that shown in Figure 6, the centrifugal action causing compression of the spring and so causing the flanges 96 and 102 to separate, whilst the engagement of these flanges when the centrifugal force is not acting limits the extension of the springs and permits the complete release of the driven plate 56.

It will be understood that the forms of centrifugal element shown in the two types of clutch illustrated are each equally well adapted to be used in a clutch of the other type, that is the L-shaped centrifugal element shown in Figures 5 to 7 might be used in a semi-centrifugal clutch, and the straight centrifugal element of Figures 1 to 4 might be used in a fully centrifugal clutch. It is not however deemed necessary to describe and illustrate the details of such modifications, as they are apparent from the description given.

I claim:

1. In a centrifugal clutch, a cover plate, a pressure plate, weighted levers pivotally mounted at their ends adjacent the axis of the clutch in brackets associated with said cover plate, for swinging movement in planes radiating from the axis of the clutch, said levers projecting in a generally radial direction so that the brackets take the outward component of the centrifugal force developed in said levers, and resilient thrust elements for transmitting the force thus centrifugally developed, from the levers to the pressure plate, the engaging pressure being provided wholly by the centrifugal force thus developed, and the extension of said resilient thrust elements being limited to permit the entire release of pressure from the pressure plate.

2. In a friction clutch, a cover plate, a pressure plate, centrifugal force-responsive elements carried by the cover plate, and resilient thrust means for transferring to the pressure plate the forces developed centrifugally in said centrifugal elements, said resilient thrust means comprising plungers in slidable association with said centrifugal force responsive elements and in positive thrust-transmitting relation to the pressure plate, and springs yieldingly interposed between the plungers and said centrifugal force responsive elements for urging them apart.

3. In a centrifugal clutch, a cover plate, a pressure plate, a plurality of loaded levers projecting in a generally radial direction from the axis of the clutch, and pivotally mounted at their inner ends on the cover plate to swing in planes radiating from said axis, and resilient thrust means arranged betwen each lever and the pressure plate to transmit the centrifugal load to the pressure plates, said resilient thrust means comprising plungers having stems mounted to slide in openings in the levers, and springs urging the plungers away from the levers.

4. In a centrifugal clutch, a cover plate, a pressure plate, a plurality of loaded levers projecting in a generally radial direction from the axis of the clutch, and pivotally mounted at their inner ends on the cover plate to swing in planes radiating from said axis, and resilient thrust means arranged between each lever and the pressure plate to transmit the centrifugal load from the levers to the pressure plate, said resilient thrust means comprising plungers having stems mounted to slide in openings in the levers, springs urging the plungers away from the levers, and stops on the plunger stems to limit the extension of the springs.

CHARLES WILLIAM HIGGS.